Patented Jan. 19, 1932

1,841,623

UNITED STATES PATENT OFFICE

MORDECAI MENDOZA, OF BLACKLEY, MANCHESTER, ENGLAND, ASSIGNOR TO IMPERIAL CHEMICAL INDUSTRIES LIMITED, OF LONDON, ENGLAND

NEW PYRAZOLONES AND DYES THEREFROM

No Drawing. Application filed July 27, 1928, Serial No. 295,851, and in Great Britain August 19, 1927. Renewed January 19, 1931.

In certain prior and copending applications, Saunders Ser. No. 53,404 filed Aug. 29, 1925 (now Pat. No. 1,766,946) and Ser. No. 115,122 filed June 10, 1926 (now Pat. No. 1,766,947); Saunders & Mendoza Ser. No. 97,758 filed Mar. 26, 1926; Saunders & Mendoza Ser. No. 138,567 filed Sept. 29, 1926 (now Pat. No. 1,766,948), and Mendoza, Ser. No. 180,618 filed April 2, 1926, there are disclosed azo and other dyes derived from intermediates of the general type

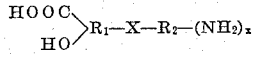

wherein $R_1$ and $R_2$ represent aryl residues, X represents a sulphone ($-SO_2$) or sulphide ($-S-$) bridge and $x$ represents 1 or 2.

The characteristics of these compounds is that they contain a chelate group, in this case the grouping

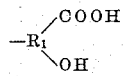

in a part of the molecule separated by the sulphone or sulphide "bridge" from that part of the molecule containing the reactive amino group. One result of this arrangement is that by utilizing the nucleus $R_2$ as the site of a chromophoric grouping, dyeings can be made which have the valuable property of remaining substantially unchanged in shade when chromed.

In acknowledged application Ser. No. 180,618, in particular, there are described compounds of a type in which X is a sulphide bridge and in which a pyrazolone ring is attached to $R_2$ in place of an amino group. The pyrazolone ring is introduced by diazotizing an amino diaryl sulphide to produce the diazo compound, the diazo compound is reduced to form the hydrazine compound and the hydrazine compound is then condensed with a beta-ketonic ester to convert the hydrazine group into a pyrazolone ring.

In all the stated prior and copending applications, the sulphone or sulphide bridge is in the para position to the hydroxy group.

In my copending applications Ser. No. 280,649 filed May 25, 1928 and Ser. No. 293,496 filed July 17, 1928 there are disclosed intermediates of the type

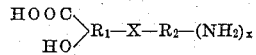

wherein $R_1$ and $R_2$ represent aryl residues, X is a sulphone or sulphide bridge and $x$ is 1 or 2 and in which the COOH group and the $-X-$ are in ortho positions to the OH group. The intermediates disclosed in these applications Ser. No. 280,649 and 293,496 differ from those of the other acknowledged applications in that the OH group is ortho to the "bridge" instead of being para to the same.

The present invention relates to further developments along these lines. I have found the intermediates disclosed in Ser. Nos. 280,649 and 293,496 may be converted into new intermediates which are also useful in the manufacture of azo dyes. These new intermediates may be made from compounds having the formula

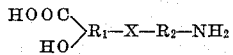

wherein X represents S or $SO_2$, $R_1$ and $R_2$ represent benzene or naphthalene residues and in which the OH and COOH groups are ortho to each other and the OH group is ortho to the X. Such compounds are diazotized to form the diazo compound and then the diazo compound is reduced to give the hydrazine compound. The hydrazine compound is condensed with a beta-ketonic ester to convert the hydrazine group into a pyrazolone ring. These new intermediates have the probable formula

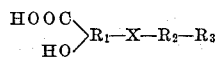

wherein $R_3$ represents the pyrazolone ring and the other symbols have their former designations.

I find that the following typical compounds are especially advantageous:

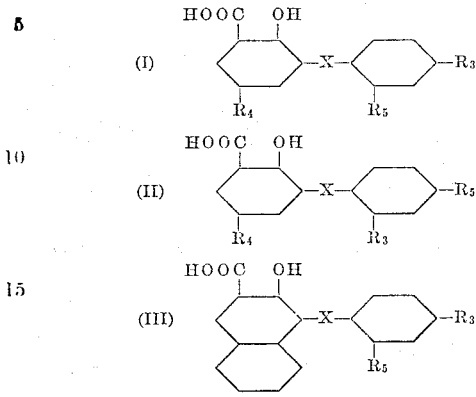

In the above formulæ, X represents S or $SO_2$, $R_4$ represents H, $CH_3$ or Cl, $R_5$ represents $SO_3H$, COOH, CHO, CN, etc. and $R_3$ represents a pyrazolone ring, for example

wherein $R_6$ represents $CH_3$, COOH or $COOC_2H_5$.

These compounds are made from the corresponding amines (that is compounds of the type shown in formulæ I—III in which there is a $NH_2$ group attached to the position occupied by $R_3$) which are described in applications Ser. No. 280,649 and 293,496, and it is to be understood that the monoamino sulphones or sulphides therein mentioned may, by my present invention, be converted into pyrazolone derivatives which are valuable intermediates for azo dyes which are not appreciably changed in shade when chromed.

By coupling my new pyrazolones with diazo components, including in this term diazotized amino compounds, diazotized amino azo compounds and tetrazotized diamino compounds, I obtain new azo or polyazo dyes which dye animal fibres in a variety of shades according to the nature of the diazo components selected, and are also valuable for chrome printing on cotton.

Among the advantageous compounds which may be diazotized and coupled with my new pyrazolone intermediates there may be mentioned para-substituted anilines, such as para-nitro-aniline and sulphanilic acid. Diazotized coupling components of the benzene and naphthalene series are advantageous, including within the term "benzene series" compounds of the benzidine type.

The following generic formulæ can be used to represent both the intermediates and the dyes of my invention

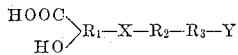

wherein $R_1$ and $R_2$ represent benzene or naphthalene residues in which the COOH and the X groups are attached to $R_1$ in the ortho positions in respect to the OH group, $R_3$ represents a pyrazolone residue and Y represents a substituent group selected from a class consisting of $-H$, $-N=N-R$ and $-N=N-R_7-N=N-R_8$, wherein R represents the coupled residue of a diazotized coupling component of the benzene or naphthalene series, $R_7$ represents a divalent residue of an azo dye component of the benzene or naphthalene series and $R_8$ represents the coupled residue of an azo dye component of the benzene or naphthalene series and X represents $SO_2$ or S. By the expression "coupled residue of an azo dye component" I mean the coupled residue from an azo dye coupling component or from a diazotized coupling component.

Another generic formula is

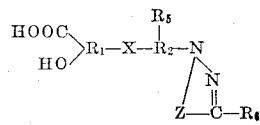

wherein $R_5$ represents a substituent group, such as $SO_3H$, COOH, CHO, CN or H, $R_6$ represents $CH_3$, COOH or $COOC_2H_5$ and Z represents the structure

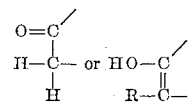

wherein R represents a coupled residue of a diazotized coupling component of the benzene or naphthalene series and the remaining symbols have their previous significance.

Still another generic formula is

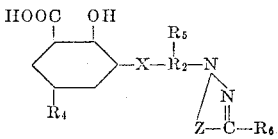

wherein $R_4$ represents a substituent group such as $CH_3$ or Cl and the remaining symbols have their previous significance.

An advantageous dyestuff falling within the purview of my invention can be represented by the formula

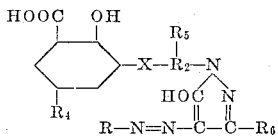

wherein the symbols have their previous significance.

The following examples illustrate, but do not limit, my invention.

*Example 1.*—42.3 parts of 2-amino-4-sulphophenyl-2-hydroxy-3-carboxy-1-naphthyl sulphone (which may be prepared according to the method described in Application Serial No. 280,649, Examples 1 and 2) are made into neutral solution in 200 parts of water with the aid of soda ash. To this solution is added 6.9 parts of sodium nitrite and the mixture is then stirred slowly into 13 parts of hydrochloric acid contained in 100 parts of water cooled to 5° C. When diazotization is complete the resulting yellow suspension is slowly added to an ice cold solution of 38 parts of sodium sulphite in 60 parts of water. The deep orange solution which is so obtained is stirred for 3–4 hours during which time it is allowed to assume the laboratory temperature. A solution of 36.5 parts of hydrochloric acid in 280 parts of water is then cautiously added, the mixture is gradually heated to boiling and kept gently boiling for a further 3 hours; stirring being maintained throughout this time. During this process the hydrazine is deposited as a thick yellow crystalline mass. While still being agitated, the mixture is then allowed to cool slowly, when it is filtered, pressed well and dried. The yield obtained is practically theoretical.

In exactly similar manner are produced the corresponding hydrazines derived from 2-amino-4-sulpho-2′-hydroxy-3′-carboxy-5′-methyl-diphenyl sulphone and 2-amino-4-sulpho-2′-hydroxy-3′-carboxy-5′-chloro diphenyl sulphone (Application Serial No. 280,649, Examples 1 and 2).

The same method of procedure is applicable to the amino-diaryl sulphides described in Application Serial No. 293,496, Example 2, and the corresponding hydrazino compounds derived from 2-amino-2′-hydroxy-4-sulpho-3′-carboxy-5′-methyl diphenyl sulphide, 5′-chloro-2′-hydroxy-2-amino-4-sulpho-3′-carboxy diphenyl sulphide, 2-amino-4-sulphophenyl 2-hydroxy-3-carboxyl-1-naphthyl sulphide etc. etc. are obtained.

Condensation of any of the above hydrazines with ethyl-acetoacetate—resulting in the formation of a 3-methyl-5-pyrazolone—is carried out in manner similar to the following:

43.8 parts of the hydrazine obtained as above from 2-amino-4-sulphophenyl 2-hydroxy-3-carboxy-1-naphthyl sulphone are dissolved in 250 parts of water and 12 parts of sodium carbonate. The slightly alkaline solution so obtained is stirred and 13 parts of ethyl acetoacetate are added. The temperature of the mixture is slowly raised to 80°–90° C., and in the course of 5–6 hours pyrazolone formation is complete. The product is isolated as a sandy colored crystalline powder by acidifying with strong hydrochloric acid, after cooling to laboratory temperatures. The yield is approximately 90 per cent of the theoretical.

*Example 2.*—The hydrazine compounds of Example 1 are convertible into the corresponding 3-carboxy-5-pyrazolone in manner similar to the following:

43.8 parts of the hydrazine derived from 2-amino-4-sulphophenyl 2-hydroxy-3-carboxy-1-naphthyl sulphone are made into a paste with 100 parts of water and 15 parts of sodium acetate. 22.6 parts of oxalacetic ester (potassium salt) are then added and the mixture is agitated at 75°–80° C. A clear solution is obtained and pyrazolone formation is complete in the course of 4–5 hours. The carboxy pyrazolone is isolated as a very light brown powder by acidification with hydrochloric acid. It has the probable formula

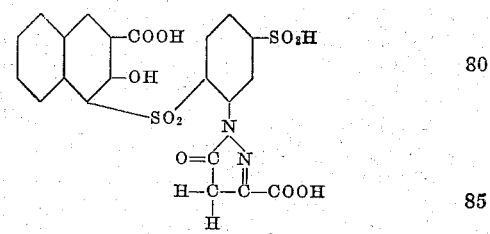

*Example 3.*—13.8 parts of *p*-nitroaniline are diazotized as usual and combined in presence of sodium carbonate with 50.4 parts of the 3-methyl-5-pyrazolone obtained as in Example 1 from 2-amino-4-sulphophenyl-2-hydroxy-3-carboxy-1-naphthyl-sulphone. Coupling results in the formation of a yellow brown dyestuff which can be isolated by the addition of common salt after giving the coupling mixture a slight mineral acidity. When dry the dyestuff is a dark orange powder soluble in water to a reddish yellow colored solution and in strong sulphuric acid to a yellowish red one from which an orange precipitate is thrown down on dilution with water. It is very sparingly soluble in strong hydrochloric acid with formation of an orange colored solution. In strong aqueous caustic soda it gives a deep brown solution. Printed on cotton with chrome mordant, yellowish brown shades are produced of very good soap and chlorine fastness. Dyed on wool from an acid bath similar shades are obtained which deepen slightly on after-chroming. The dyestuff has the probable formula

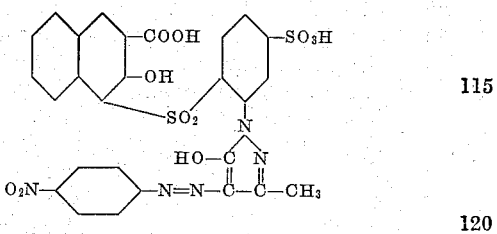

*Example 4.*—The diazo compound derived from 23.9 parts of 1-amino-2-naphthol-4-sulphonic acid is combined, in the presence of soda, with 50.4 parts of the pyrazolone used in the preceding example. Combination results in the production of a red dyestuff which may be isolated by salting out the heated solution after coupling is completed and after giving the solution a slight mineral acidity. The dyestuff when dried and ground is a bright red powder soluble in water to a red orange colored solution. When dissolved in concentrated sulphuric acid it gives a bright blue red colored solution which becomes scarlet on dilution with water. It is sparingly soluble in warm strong hydrochloric acid giving a blue red colored solution which on dilution with water changes in color to orange. It dissolves in strong aqueous caustic soda to a red brown colored solution. When printed on cotton with chrome mordant it gives red shades of very good fastness to soaping and chlorine. Wool is dyed by it from an acid bath in similar shades which are not appreciably changed on after-chroming. By combining the pyrazolone used in this and the preceding example with the diazo derivative from 17.3 parts of sulphanilic acid, the dyestuff obtained produces yellow shades on cotton and wool while the substitution of the diazo body from 22.3 parts of naphthionic acid results in the formation of a dyestuff which yields orange shades. Both of these dyestuffs show good fastness to soap and chlorine. Dyestuffs of very similar shades, which are fast to soap and chlorine are also produced when the pyrazolone used in their preparation is replaced by the corresponding pyrazolone derived from 2-amino-2'-hydroxy-4-sulpho-3'-carboxy-5'-methyldiphenyl sulphone and 2-amino-2'-hydroxy-4-sulpho-3'-carboxyl-5'-chlorodiphenyl sulphone.

*Example 5.*—13.8 parts of nitroaniline are diazotized as usual and combined in presence of sodium carbonate with 53.4 parts of the 3-carboxy-5-pyrazolone obtained from 2-amino-4-sulphophenyl-2-hydroxy-3-carboxy-1-naphthyl sulphone as in Example 2 above. The dyestuff is isolated as in Example 3.

When dyed it is a yellow red powder soluble in water to a yellow red solution. It dissolves in concentrated sulphuric acid to a deep red solution which gives, on diluting with water, a light red precipitate. It is only sparingly soluble in strong hydrochloric acid. It dissolves readily in strong aqueous caustic soda to an olive green colored solution. Cotton is printed by it in the presence of chrome mordant in light brown shades fast to soap and chlorine. Similar shades are produced on wool from an acid bath.

Combination of the above pyrazolone with the equivalent amount of the diazo derivative of sulphanilic acid results in the formation of a dyestuff which produces brown shades on cotton and wool. A dyestuff which yields somewhat deeper shades of brown is produced when naphthionic acid is used as the diazo component. As in Example 3 very similar dyestuffs are produced when the corresponding carboxy pyrazolone derived from 2-amino-2'-hydroxy-4-sulpho-3'-carboxy-5'-methyldiphenyl sulphone and 2'-amino-2'-hydroxy-4-sulpho-3'-carboxy-5'-chlorodiphenyl sulphone are used in place of the pyrazolone above mentioned.

*Example 6.*—The diazo compound obtained in the customary manner from 22.3 parts of naphthionic acid is combined in the presence of sodium carbonate with 43.6 parts of the 3-methyl-5-pyrazolone prepared as in Example 1 from 2-amino-2'-hydroxy-4-sulpho-3'-carboxy-5'-methyl diphenyl sulphide. Coupling is very rapid and, when complete, the new dyestuff is isolated as a yellowish brown powder by salting out after giving the coupling solution a slight mineral acidity. It has the probable formula

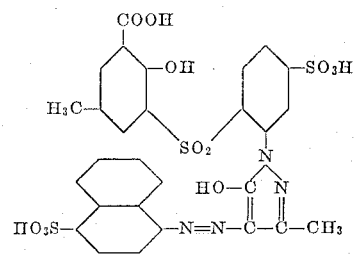

Wool is dyed by it from an acid bath in brown shades which are deepened slightly on after-chroming. Cotton is printed—in the presence of chrome mordant—in light brown shades of good fastness to soaping and fairly good fastness to chlorine.

The color similarly obtained when sulphanilic acid is used as the diazo component, yields yellow shades on wool and cotton. Dyestuffs of very similar shades and fastness pyrazolone are produced when the methyl pyrazolone used above is replaced by those derived as in Example 1 from 2-amino-2'-hydroxy-4-sulpho-3'-carboxy diphenyl sulphide and 2-amino-4-sulphophenyl 2-hydroxy-3-carboxy-1-naphthyl sulphide.

*Example 7.*—The diazo compound from 15 parts of *p*-amino acetanilide is coupled at about 10° C. with 48.65 parts of the 3-carboxy-5-pyrazolone prepared from 5-chloro-2-amino-2'-hydroxy-4-sulpho-3'-carboxy diphenyl sulphide (according to the method described in Example 2 above) dissolved in 400 parts of water and sufficient soda ash to ensure an alkaline medium. Coupling is completed in the course of an hour.

The dyestuff is isolated by addition of salt after making the reaction mixture neutral.

From an acid bath it dyes wool in warm brown shades fast to soaping. After-chroming produces no change in shade. Printed on cotton with chrome mordant red brown shades of fairly good soap and chlorine fastness are obtained.

If in place of the above carboxy pyrazolone the corresponding compounds derived from 2-amino-2'-hydroxy-4-sulpho-3'-carboxy-5'-methyl diphenyl sulphide and 2-amino-4-sulphophenyl 2-hydroxy-3-carboxy-1-naphthyl sulphide are used as coupling components, dyestuffs similar in shade and properties are obtained.

*Example 8.*—18.4 parts of benzidine are tetrazotized in the customary manner and the clear tetrazo solution is quickly added at 5–10° C. to a stirring solution of 13.8 parts of salicylic acid in 35 parts of sodium carbonate and 300 parts of water.

When formation of the orange yellow monoazo intermediate compound is complete, a solution of 48.65 parts of the 3-carboxy-5-pyrazolone derived as in Example 2 from 5′-chloro- 2 -amino-2′-hydroxy-4-sulpho-3′-carboxy diphenyl sulphide in 400 parts of water and 12 parts of sodium carbonate is added. The second coupling proceeds with the disappearance of the orange yellow suspension of the monoazo intermediate compound and formation of a deep red brown solution from which, on completion of the coupling, the new dyestuff is isolated as a red brown powder by salting out after giving the solution a slight mineral acidity. The dyestuff is soluble in hot water forming an orange colored solution. It gives—in concentrated sulphuric acid—a violet colored solution from which a brown precipitate is thrown down on dilution with water. It is insoluble in strong hydrochloric acid. With strong aqueous caustic soda it gives a yellow brown colored solution.

It dyes wool from an acid bath in bright orange shades fast to soaping. On afterchroming the shade is very slightly browned. When printed on cotton with chrome mordant brown shades of fairly good soap and chlorine fastness are obtained.

As in Example 7, the use of the analogous carboxy pyrazolones derived from 2-amino-4-sulpho-2′-hydroxy-3′-carboxy-5′-m e t h y l diphenyl sulphide and 2-amino-4-sulphodiphenyl 2-hydroxy-3-carboxy-1-naphthyl sulphide in place of the carboxy pyrazolone above mentioned results in the production of dyestuffs of very similar shades and properties.

What I claim and desire to secure by Letters Patent is:—

1. In the manufacture of new dyestuff intermediates and new azo dyes therefrom, the steps which comprise diazotizing a diaryl compound of the type

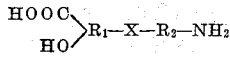

wherein $R_1$ and $R_2$ represent benzene or naphthalene residues, X represents $SO_2$ or S and the X and the COOH groups are attached to $R_1$ in the ortho positions in respect to the OH group; reducing the diazo compound so obtained to the hydrazine compound and then condensing the said hydrazine compound with a beta ketonic ester.

2. In the manufacture of new dyestuff intermediates and new azo dyes therefrom, the steps which comprise diazotizing a diaryl compound of the type

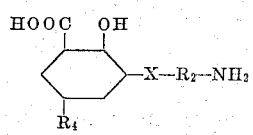

wherein $R_2$ represents a benzene or naphthalene residue, X represents $SO_2$ or S, $R_4$ represents H, $CH_3$ or Cl; reducing the diazo compound so obtained to the hydrazine and then condensing the said hydrazine compound with a beta ketonic ester.

3. In the manufacture of new dyestuff intermediates and new azo dyes therefrom, the steps which comprise diazotizing a diaryl compound of the type

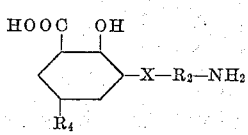

wherein $R_2$ represents a benzene or naphthalene residue, X represents $SO_2$ or S, $R_4$ represents H, $CH_3$ or Cl; reducing the diazo compound so obtained to the hydrazine and then condensing the said hydrazine compound with an ethyl-aceto-acetate.

4. In the manufacture of new dyestuff intermediates and new azo dyes therefrom, the steps which comprise diazotizing a diaryl compound of the type

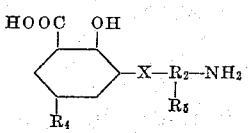

wherein X represents $SO_2$ or S, $R_2$ represents a benzene residue, $R_4$ represents H, $CH_3$ or Cl, and $R_5$ represents $SO_3H$, COOH, CHO, CN or H; reducing the diazo compound to the hydrazine and then condensing the said hydrazine compound with a beta-ketonic ester.

5. In the manufacture of new dyestuff intermediates and new azo dyes therefrom, the steps which comprise diazotizing a diaryl compound of the type

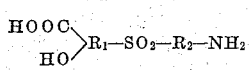

wherein $R_1$ and $R_2$ represent benzene and naphthalene residues and in which the $SO_2$ and the COOH groups are attached to $R_1$ in the ortho positions in respect to the OH group; reducing the diazo compound so obtained to the hydrazine compound and then condensing the said hydrazine compound with a beta ketonic ester.

6. In the manufacture of new dyestuff intermediates and new azo dyes therefrom, the steps which comprise diazotizing a diaryl compound of the type

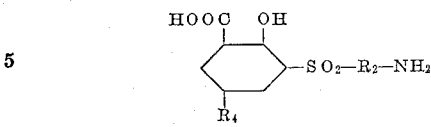

wherein $R_2$ represents a benzene or naphthalene residue and $R_4$ represents H, $CH_3$ or Cl; reducing the diazo compound so obtained to the hydrazine and then condensing the said hydrazine compound with a beta-ketonic ester.

7. In the manufacture of new dyestuff intermediates and new azo dyes therefrom, the steps which comprise diazotizing a diaryl compound of the type

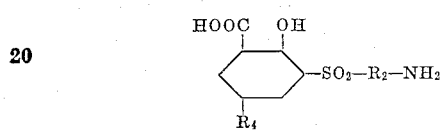

wherein $R_2$ represents a benzene or naphthalene residue and $R_4$ represents H, $CH_3$ or Cl; reducing the diazo compound so obtained to the hydrazine and then condensing the said hydrazine compound with an ethyl-aceto-acetate.

8. In the manufacture of new dyestuff intermediates and new azo dyes therefrom, the steps which comprise diazotizing a diaryl compound of the type

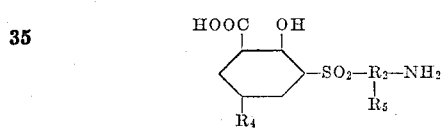

wherein $R_2$ represents a benzene residue, $R_4$ represents H, $CH_3$ or Cl, and $R_5$ represents $SO_3H$, COOH, CHO, CN or H; reducing the diazo compound to the hydrazine and then condensing the said hydrazine compound with a beta-ketonic ester.

9. In the manufacture of new dyestuff intermediates and new azo dyes therefrom, the process which comprises diazotizing a diaryl compound of the type

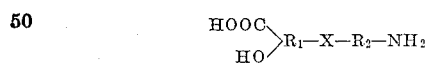

wherein $R_1$ and $R_2$ represent benzene or naphthalene residues, X represents $SO_2$ or S and the X and the COOH groups are attached to $R_1$ in the ortho positions in respect to the OH group; reducing the diazo compound so obtained to the hydrazine compound, condensing the said hydrazine compound with a beta-ketonic ester to produce a pyrazolone derivative and then coupling the so produced pyrazolone derivative with a diazo compound of the benzene or naphthalene series.

10. In the manufacture of new dyestuff intermediates and new azo dyes therefrom, the process which comprises diazotizing a diaryl compound of the type

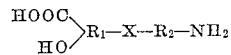

wherein $R_1$ and $R_2$ represent benzene or naphthalene residues, X represents $SO_2$ or S and the COOH groups are attached to $R_1$ in the ortho positions in respect to the OH group; reducing the diazo compound so obtained to the hydrazine compound, condensing the said hydrazine compound with a beta-ketonic ester to produce a pyrazolone derivative and then coupling the so produced pyrazolone derivative with a diazotized coupling component of the benzene or naphthalene series.

11. In the manufacture of azo dyestuff intermediates and new azo dyes therefrom, the process which comprises diazotizing a diaryl compound of the type

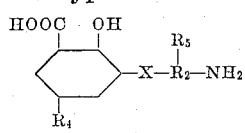

wherein X represents $SO_2$ or S, $R_2$ represents a benzene residue, $R_4$ represents H, $CH_3$ or Cl, and $R_5$ represents $SO_3H$, COOH, CHO, CN or H; reducing the diazo compound to the hydrazine compound, condensing the said hydrazine compound with a beta-ketonic ester to produce a pyrazolone derivative, and then coupling the so produced pyrazolone derivative with a diazo compound of the benzene or naphthalene series.

12. In the manufacture of azo dyestuff intermediates and new azo dyes therefrom, the process which comprises diazotizing a diaryl compound of the type

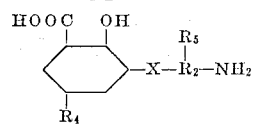

wherein X represents $SO_2$ or S, $R_2$ represents a benzene residue, $R_4$ represents H, $CH_3$ or Cl, and $R_5$ represents $SO_3H$, COOH, CHO, CN or H; reducing the diazo compound to the hydrazine compound, condensing the said hydrazine compound with ethyl-aceto-acetate to produce a pyrazolone derivative, and then coupling the so produced pyrazolone derivative with a diazo compound of the benzene or naphthalene series.

13. As new azo dyestuff intermediates and related azo dyestuffs, the compositions of matter represented by the following probable formula

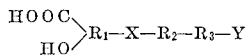

wherein $R_3$ represents a pyrazolone ring, $R_1$ and $R_2$ represent benzene or naphthalene residues, Y represents a substituent group selected from a class consisting of —H, $-N=N-R$ and $-N=N-R_7-N=N-R_8$, wherein R represents the coupled residue of a diazotized coupling component of the benzene or naphthalene series, $R_7$ represents a divalent residue of an azo dye component of the benzene or naphthalene series and $R_8$ represents the coupled residue of an azo dye component of the benzene or naphthalene series, X represents $SO_2$ or S and in which the X and the COOH groups are attached to $R_1$ in the ortho positions in respect to the OH group.

14. As new azo dyestuff intermediates and related azo dyestuffs, the compositions of matter represented by the following probable formula

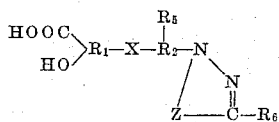

wherein X represents $SO_2$ or S, $R_1$ and $R_2$ represent benzene or naphthalene residues in which the COOH and the X are ortho to the OH group, $R_5$ represents $SO_3H$, COOH, CHO, CN or H, $R_6$ represents $CH_3$, COOH or $COOC_2H_5$ and Z represents the structure $$\begin{array}{cc} O=C & O=C \\ | & \| \\ H-C- & \text{or} \quad HO-C \\ | & | \\ H & R-N:N-C- \end{array}$$

wherein R represents a coupled residue of an azo dye component from a diazo compound of the benzene or naphthalene series.

15. As new dyestuff intermediates, compounds having the probable formula

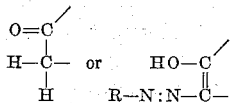

wherein $R_3$ represents a pyrazolone ring, $R_1$ and $R_2$ represent benzene or naphthalene residues, X represents $SO_2$ or S, and in which the X and the COOH group are attached to $R_1$ in the ortho positions in respect to the OH group, the said intermediates being light colored powders easily soluble in alkalies, very sparingly soluble in water and dilute mineral acids, and readily coupled with diazotized coupling components of the benzene or naphthalene series to form brown to yellow dyestuffs.

16. As new dyestuff intermediates, compounds having the probable formula

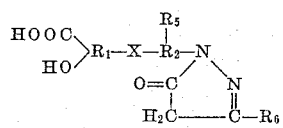

wherein $R_1$ represents a benzene or naphthalene residue, $R_2$ represents a benzene residue, X represents $SO_2$ or S, $R_5$ represents $SO_3H$, CHO, CN or H, and $R_6$ represents $CH_3$, COOH or $COOC_2H_5$ and in which the X and the COOH group are attached to $R_1$ in the ortho positions in respect to the OH group.

17. As new dyestuff intermediates, compounds having the probable formula

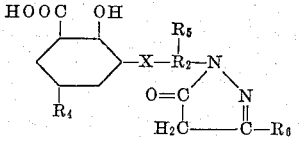

wherein $R_2$ represents a benzene residue, $R_4$ represents H, $CH_3$ or Cl, $R_5$ represents $SO_3H$, COOH, CHO, CN or H, $R_6$ represents $CH_3$, COOH or $COOC_2H_5$ and X represents S or $SO_2$.

18. As new dyestuff intermediates, compounds having the probable formula

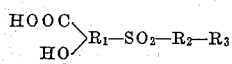

wherein $R_3$ represents a pyrazolone ring, $R_1$ and $R_2$ represent benzene or naphthalene residues, and the $SO_2$ and the COOH group are attached to $R_1$ in the ortho positions in respect to the OH group, the said intermediates being light colored powders easily soluble in alkalies, very sparingly soluble in water and dilute mineral acids and readily coupled with diazotized coupling components of the benzene or naphthalene series to form brown to yellow dyestuffs.

19. As new dyestuff intermediates, compounds having the probable formula

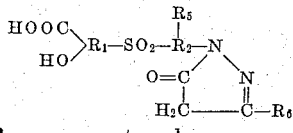

wherein $R_1$ represents a benzene or naphthalene residue, $R_2$ represents a benzene residue, $R_5$ represents $SO_3H$, CHO, CN or H, and $R_6$ represents $CH_3$, COOH or $COOC_2H_5$ and in which the $SO_2$ and the COOH group are attached to $R_1$ in the ortho positions in respect to the OH group.

20. As new dyestuff intermediates, compounds having the probable formula

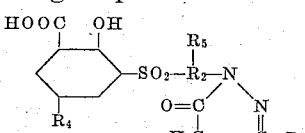

wherein $R_2$ represents a benzene residue, $R_4$ represents H, $CH_3$ or Cl, $R_5$ represents $SO_3H$, COOH, CHO, CN or H, and $R_6$ represents $CH_3$, COOH or $COOC_2H_5$.

21. As a new dyestuff intermediate, the compound having the probable formula

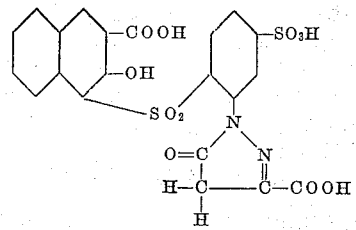

22. Azo dyes carrying a chelate group and adapted for mordant dyeing with the chelate group separated from the chromophore group by a sulphone or sulphide bridge, said azo dyes being pyrazolone derivatives having the probable formula

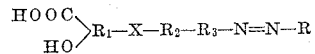

wherein X represents $SO_2$ or S, $R_1$ and $R_2$ represent benzene or naphthalene residues, $R_3$ represents a pyrazolone ring and R represents a coupled residue of an azo dye component derived from a diazo compound of the benzene or naphthalene series and in which the X and the COOH groups are attached to the $R_1$ in the ortho positions to the OH group, the said dyestuffs producing shades which are substantially unchanged when chromed.

23. Azo dyes carrying a chelate group and adapted for mordant dyeing, with the chelate group separated from the chromophore group by a sulphone or sulphide bridge, said azo dyes being pyrazolone derivatives having the probable formula

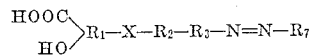

wherein X represents $SO_2$ or S, $R_1$ and $R_2$ represent benzene or naphthalene residues, $R_3$ represents a pyrazolone ring and $R_7$ represents a coupled residue from a diazotized monoamino coupling component of the benzene or naphthalene series and in which the X and the COOH groups are attached to $R_1$ in the ortho positions to the OH groups.

24. Azo dyes carrying a chelate group and adapted for mordant dyeing, with the chelate group separated from the chromophore group by a sulphur containing bridge, said azo dyes being pyrazolone derivatives having the probable formula

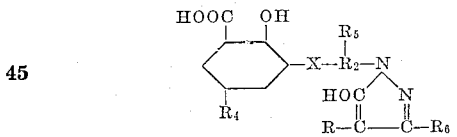

wherein X represents $SO_2$ or S, $R_2$ represents a benzene residue, $R_4$ represents H, $CH_3$ or Cl, $R_5$ represents $SO_3H$, COOH, CHO, CN or H, $R_6$ represents $CH_3$, COOH or $COOC_2H_5$ and R represents a coupled residue of an azo dye component derived from a diazo compound of the benzene or naphthalene series.

25. Azo dyes carrying a chelate group and adapted for mordant dyeing, with the chelate group separated from the chromophore group by a sulphone bridge, said azo dyes being pyrazolone derivatives having the probable formula

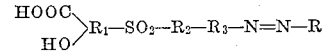

wherein $R_1$ and $R_2$ represent benzene or naphthalene residues, $R_3$ represents a pyrazolone ring and R represents a coupled residue of an azo dye component derived from a diazo compound of the benzene or naphthalene series and in which the $SO_2$ and COOH groups are attached to $R_1$ in the ortho positions in respect to the OH group, the said dyestuffs producing shades which are substantially unchanged when chromed.

26. Azo dyes carrying a chelate group and adapted for mordant dyeing, with the chelate group separated from the chromophore group by a sulphone bridge, said azo dyes being pyrazolone derivatives having the probable formula

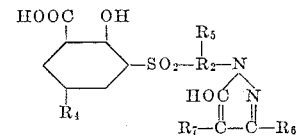

wherein $R_2$ represents a benzene residue, $R_4$ represents H, $CH_3$ or Cl, $R_5$ represents $SO_3H$, COOH, CHO, CN or H and $R_6$ represents $CH_3$, COOH or $COOC_2H_5$ and $R_7$ represents a coupled residue from a diazotized coupling component of the benzene or naphthalene series, the said dyestuffs producing shades which are substantially unchanged when chromed.

27. As a new dyestuff, a compound having the probable formula

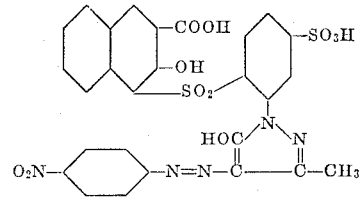

28. As a new dyestuff, a compound having the probable formula

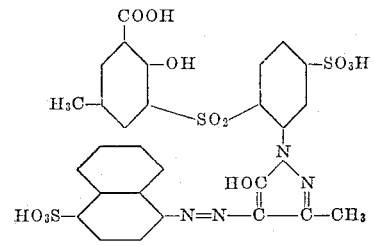

In testimony whereof I affix my signature.
MORDECAI MENDOZA.

Certificate of Correction

Patent No. 1,841,623.   Granted January 19, 1932, to

MORDECAI MENDOZA.

It is hereby certified that error appears in the printed specification of the above-numbered patent requiring correction as follows: Page 2, after line 23, strike out the formula and insert instead

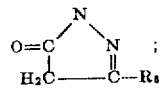

page 4, line 100, strike out the word "pyrazolone"; page 6, line 71, claim 10, after "and" insert *the X and;* and that the said Letters Patent should be read with these corrections therein that the same may conform to the record of the case in the Patent Office.

Signed and sealed this 1st day of March, A. D. 1932.

[SEAL.]

M. J. MOORE,
*Acting Commissioner of Patents.*